United States Patent
Johnson et al.

(10) Patent No.: US 9,021,777 B2
(45) Date of Patent: May 5, 2015

(54) CUTTER GUARD FOR A LAWN MOWER

(71) Applicant: Robert Bosch GmbH, Stuttgart (DE)

(72) Inventors: William Johnson, Ipswich (GB);
Richard Baxter, Stowmarket (GB);
Lewis Marshall, Stowmarket (GB)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 13/867,239

(22) Filed: Apr. 22, 2013

(65) Prior Publication Data
US 2013/0291506 A1 Nov. 7, 2013

(30) Foreign Application Priority Data

Apr. 24, 2012 (EP) ..................................... 12165410

(51) Int. Cl.
| | |
|---|---|
| A01D 67/00 | (2006.01) |
| A01D 34/81 | (2006.01) |
| A01D 34/00 | (2006.01) |

(52) U.S. Cl.
CPC .............. A01D 34/81 (2013.01); A01D 34/008 (2013.01)

(58) Field of Classification Search
USPC ................ 56/1, 10.5, 12.7–12.9, 17.4, 320.1, 56/320.2, 17.5, 255, 295, 16.7
See application file for complete search history.

(56) References Cited

U.S. PATENT DOCUMENTS

| | | | | |
|---|---|---|---|---|
| 3,057,140 | A | * | 10/1962 | Ridenour et al. ............... 56/10.5 |
| 3,481,124 | A | * | 12/1969 | Machovina ..................... 56/255 |
| 4,205,510 | A | * | 6/1980 | Raniero ......................... 56/12.9 |
| 6,003,292 | A | * | 12/1999 | Waibel .......................... 56/320.2 |
| 6,269,621 | B1 | * | 8/2001 | Fischier et al. ................. 56/255 |
| 7,963,041 | B1 | | 6/2011 | Smith |

FOREIGN PATENT DOCUMENTS

| | | |
|---|---|---|
| EP | 0 808 096 B1 | 10/1998 |
| EP | 1 749 431 A1 | 2/2007 |
| EP | 2 412 219 A1 | 2/2012 |
| WO | 2011/073773 A1 | 6/2011 |

* cited by examiner

*Primary Examiner* — Robert Pezzuto
(74) *Attorney, Agent, or Firm* — Maginot, Moore & Beck LLP (57) ABSTRACT

A cutter guard for a rotating blade of a lawn mower, particularly for a robotic, self-guided or autonomous lawn mower forms a cutting bowl in which the blade is mounted for rotation about a generally vertical axis. The guard comprises a generally planar guard section surrounded by an arcuate section, transverse edges of which define an opening in the cutter guard, which in operation is pointed to the front of the lawn mower, to allow uncut grass to be accessed by the cutting blades. The arcuate section comprises a plurality of apertures.

20 Claims, 8 Drawing Sheets

CUTTER GUARD FOR A LAWN MOWER

This application claims priority under 35 U.S.C. §119 to patent application no. EP 12165410.7, filed on Apr. 24, 2012 with the European Patent Office, the disclosure of which is incorporated herein by reference in its entirety.

The present disclosure relates to a cutter guard for a rotating blade of a lawn mower, particularly for a robotic, self-guided or autonomous lawn mower.

BACKGROUND

Conventional rotary lawn mowers, in which a motor-driven blade rotates about a generally vertical axis, require a guard around the blade to prevent injury to users or other people in the proximity of the mower during operation. An inevitable consequence of such a guard is the build-up of debris, principally in the form of grass cuttings, on the underside of, and around the cutter guard. Generally, such lawn mowers have large motor which provide a surplus of power, which allows the continued operation of blade in spite of the debris build-up.

In a battery-operated robotic mower, however, such a build-up of grass cuttings around the inside of the cutter guard is more critical. The use of batteries means that power needs to be conserved as much as possible to maximise the length of time for which the robotic mower can operate. This typically involves the use of smaller, lighter and usually lower-powered motors. A preferred cutting system for such applications (see patent application EP0808096) is one in which the motor drives a solid circular cutter disc of substantially smooth form at the outer edge of which are mounted a number of light weight sharpened thin steel cutter blades. These blades can rotate freely with respect to the cutter disc for minimal drag while still cutting the grass efficiently due to their inertia and sharpness. The lower power supplied to the cutting blades means that any debris build-up is likely to have a considerable detrimental effect on the operation of the mower. It will be appreciated that the practical use of a robotic lawnmower will involve cutting the grass more frequently such that often only a small amount of growth has occurred since the last cut. Such small grass elements are especially prone to sticking to and building up on surfaces with which they may come into contact.

A robotic mower typically has an outer shell, which acts as or provides support for a collision detector. This shell can also act as a guard for the blade mechanism, to a certain extent. A full guard for the blade is therefore unnecessary to the same degree as for a conventional mower.

SUMMARY

The current disclosure therefore seeks to provide a guard structure which prevents fingers being put near to the blades whilst allowing grass cuttings to pass through gaps in the structure, thus preventing debris build up. An air stream may be provided to blow across the underside of the cutter guard to assist in the removal of grass cuttings and other debris from the cutter guard and the cutter.

Accordingly, in its broadest aspect, the present disclosure provides a cutter guard for a rotatable blade of a robotic rotary lawn mower, the guard forming a cutting bowl in which the blade is mounted for rotation about a generally vertical axis; and wherein the guard comprises a generally planar guard section surrounded by an arcuate section, transverse edges of which define an opening in said cutter guard, such as to define an opening, which in operation is pointed to the front of the lawn mower, to allow uncut grass to be accessed by the cutting blades, the arcuate section comprising a plurality of apertures.

Preferably the arcuate section subtends an angle of between 180° and 270° at the centre of the guard.

More preferably the arcuate section subtends an angle of about 240° at the centre of the guard.

Preferably the apertures occupy an area greater than about 40% of the planar area of said arcuate section, preferably said apertures occupy more than about 50% of the area of said arcuate section.

Preferably the apertures occupy at least 35%, preferably at least about 40% of the area of the first 60° to 90°, preferably 70° to 80° and more preferably about 75° of the arcuate section from a point of meeting of an inner edge of said opening with a side edge of said opening.

Preferably the cutter guard further comprises a first lip section extending downwardly from the outer edge of the arcuate section to a point substantially aligned with the blade.

Preferably the cutter guard further comprises a second lip section upwardly extending along the length of opening.

Preferably the cutter guard further comprises between three and ten apertures;

More preferably the cutter guard further comprises between four and eight apertures;

Yet more preferably the cutter guard further comprises between five and seven apertures;

Optionally the cutter guard further comprises six apertures.

Preferably the apertures are substantially circular;

More preferably, the apertures are elliptical.

Yet more preferably the apertures are annular segment shaped or rectangular.

Preferably the apertures are of different sizes and subtend angles between 15° and 60° at the centre of the cutter guard.

Preferably the apertures located adjacent to the grass entry opening are larger than apertures remote the opening.

Preferably, the cutter guard comprises six apertures, two of size substantially 45° around the circumference of the annular section, two of substantially 28° and two of substantially 24°.

In a modification, the arcuate section is formed by a plurality of discrete arcuate section elements.

Optionally one or more apertures is defined by one or more spaces between adjacent arcuate section elements.

The present disclosure also provides a rotary lawn mower, having a cutting bowl, at least one blade, a motor and a housing for the motor, and further comprises a cutter guard comprising a mount for mounting to the bowl, a generally planar guard section surrounded by an arcuate section, the annulus comprising a plurality of apertures.

Preferably the rotary lawn mower further comprises a fan located in the housing, the fan being located above and powered by the motor and a channelling means to guide an airstream from the fan radially across the surface of the cutter guard.

Preferably, the cutting system comprises a cutter disc mounting at least one cutting blade, wherein the cutter guard apertures do not extend over said cutter disc.

BRIEF DESCRIPTION OF THE DRAWINGS

The above and other aspects of the disclosure will now be described in further detail, by way of example only, with reference to the accompanying drawings in which.

DETAILED DESCRIPTION

Figure 1:
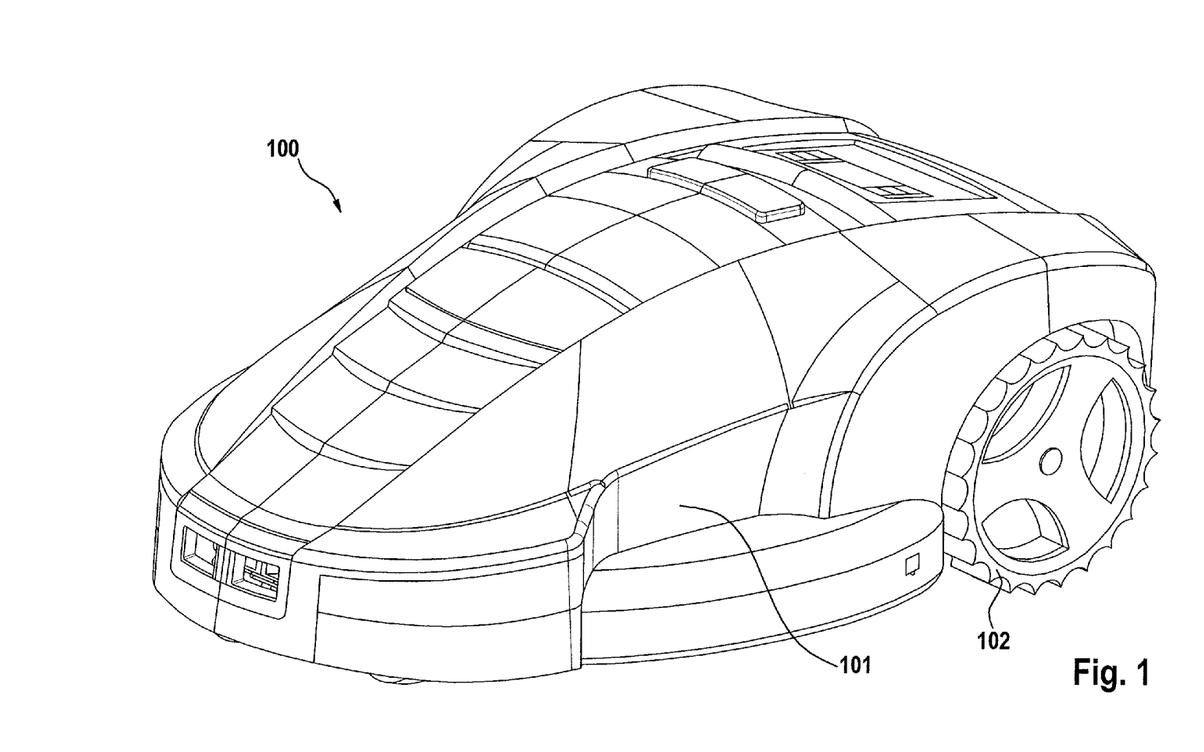
FIG. 1 illustrates a robotic lawn mower with an outer shell, for which the disclosure is suitable.
Figure 2:
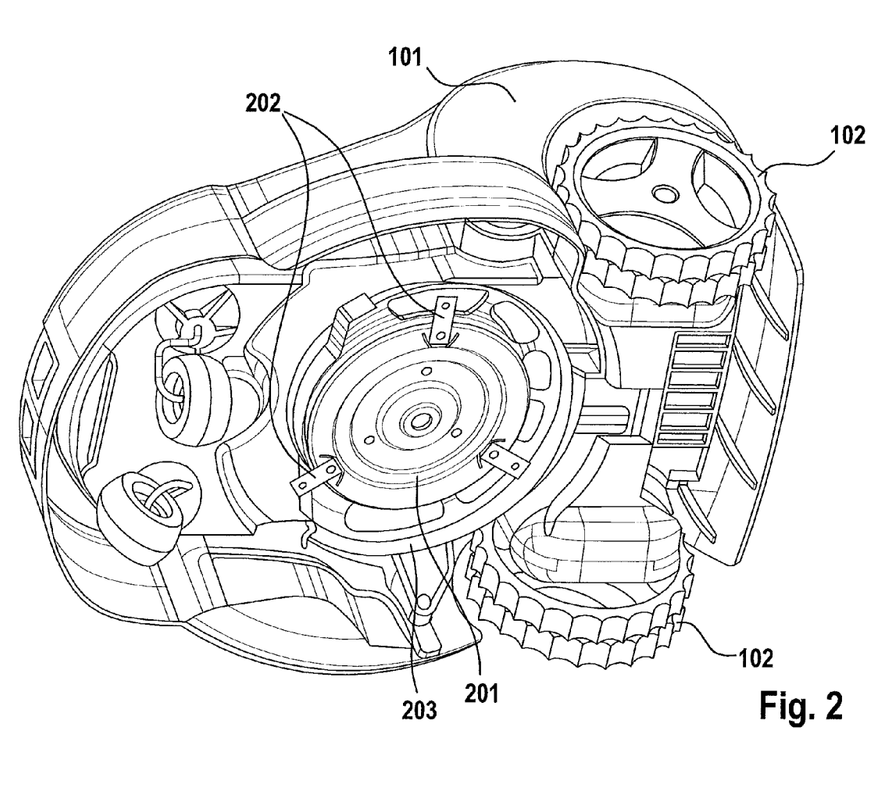
FIG. 2 illustrates a perspective view of the underside of the mower, showing an embodiment of the cutter guard according to the present disclosure.

A robotic lawn mower 100 is illustrated in FIG. 1. A lawn mower of this type has an outer shell 101, which provides an aesthetic cover and provides some protection around the blades of the device and removes the need for a guard to completely cover the blades and driving wheels 102. FIG. 2 provides a perspective view of the underside of the mower of FIG. 1. The cutting disc 201 to which are mounted a plurality of replaceable blades 202 mounted within a cutter guard 203.

Figure 3:
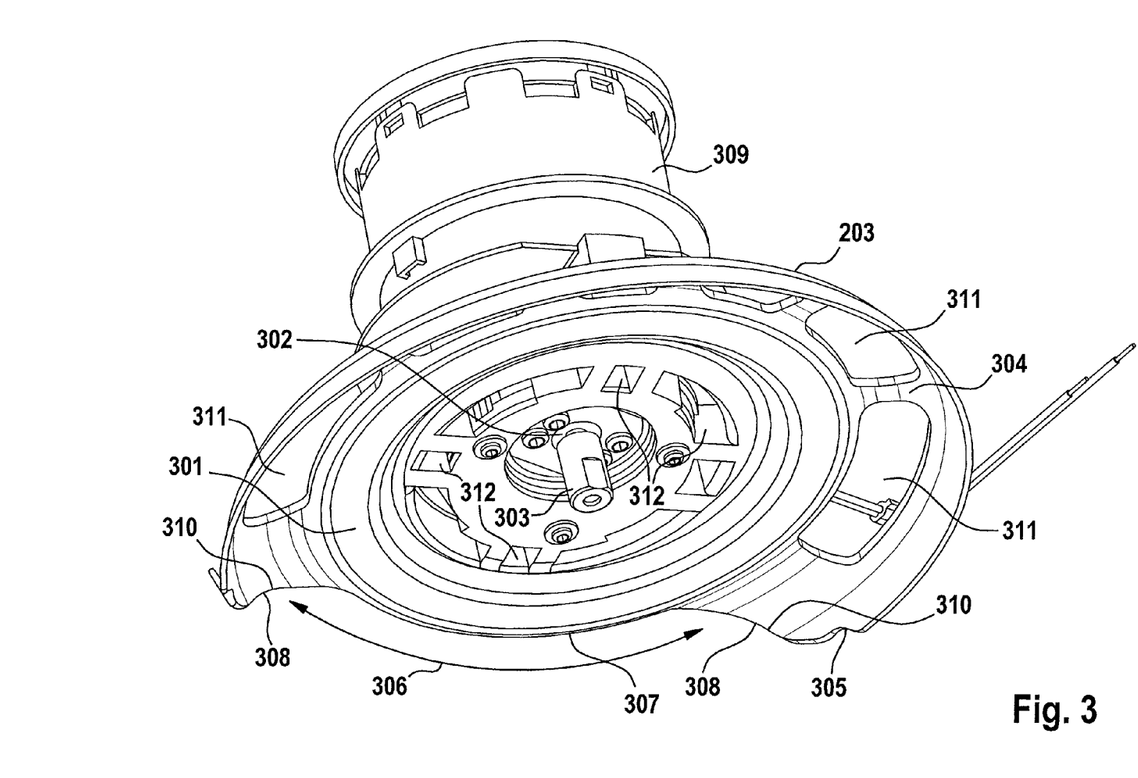
FIG. 3 is a perspective view of the underside of the cutter guard of FIG. 2 coupled to a motor housing.

FIG. 3 shows a perspective view of the underside of the cutter guard 203. In the embodiment shown, there is provided a generally planar guard element in the form of a disc section 301, through which an aperture 302 is provided to allow a motor output shaft 303 for powering the cutting system (omitted for clarity) to pass. The underside of the cutter guard 203 defines a cutting bowl. An arcuate section 304, with transverse edges 310 partially surrounds the disc section 301. An operatively downwardly extending lip 305 is provided around the arcuate section 304. An opening 306, having an inner edge 307 and two side edges 308, coincident with transverse edges 310 of the arcuate section is formed around the section of the disc not surrounded by the arcuate section. In the arcuate section, apertures 311 are provided.

The cutting system consists of a solid circular cutter disc 201 of substantially smooth form. At its outer edge 3 short, thin sharpened steel blades 202 are mounted to pivot freely so as to cut the grass by their centrifugal loading, but to swing back and limit the maximum electrical power drawn in tougher conditions. In the preferred embodiments, the diameter of disc section 301 of cutter guard 203 corresponds generally with the diameter of the cutter disc so that the cutting itself always takes place outside this diameter and within opening 306 or beneath arcuate section 304.

In operation, the cutting disc and blades of the mower rotate within the cavity formed by disc 301, arcuate section 304 and lip 305. The apertures in the arcuate section preferably extend over the blades, but do not extend over the cutting disc. The opening 306 is orientated towards substantially the front of the mower. The opening 306 allows the mower to pass over uncut grass without compressing it, thus allowing contact between grass and blades. Cut grass would, in a mower with a conventional cutter guard, build up on the underside of the guard. In a low-power battery operated system such as a robotic mower, this would have a detrimental effect on the operation of the blade. This problem is overcome by the recognition that, with the outer shell 101 of a robot mower, less substantial protection of the blade is required. This recognition allows apertures 311 to be provided in the annular segment sections, which allow an exit route for the grass cuttings from the cavity of the cutting bowl. This exit is facilitated by the blowing of an air stream radially across the underside of the cutting bowl, from air inlet apertures 312.

This air stream originates from a fan located in the housing 309 for the mower motor. The air forces any debris/cutting build-up from the surfaces of the blades and cutting disc, and also from the underside of the cutting bowl. The grass cuttings dislodged by the air stream or projected by the action of the cutting blades are expelled from the cutting cavity through the apertures 311.

Figure 4:
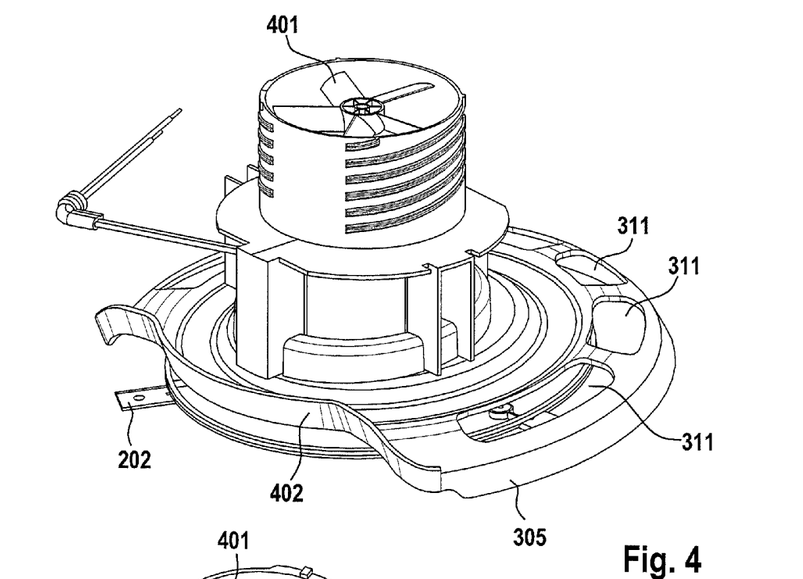
FIG. 4 is a top perspective view of a motor housing and cutter guard of FIG. 3.

The creation and action of the air stream are further illustrated in FIGS. 4 to 7. FIG. 4 is a perspective view of the motor housing with the upper section removed, to show a fan 401. The fan provides a downward air stream, which cools the motor and provides the radial air stream across the undersurface of the cutting bowl. The upper surface of the cutter guard is also shown. There is provided an upwardly extending lip 402, locate above the grass entry opening, which helps to prevent the build-up of debris on the upper surface of the guard.

Figure 5:
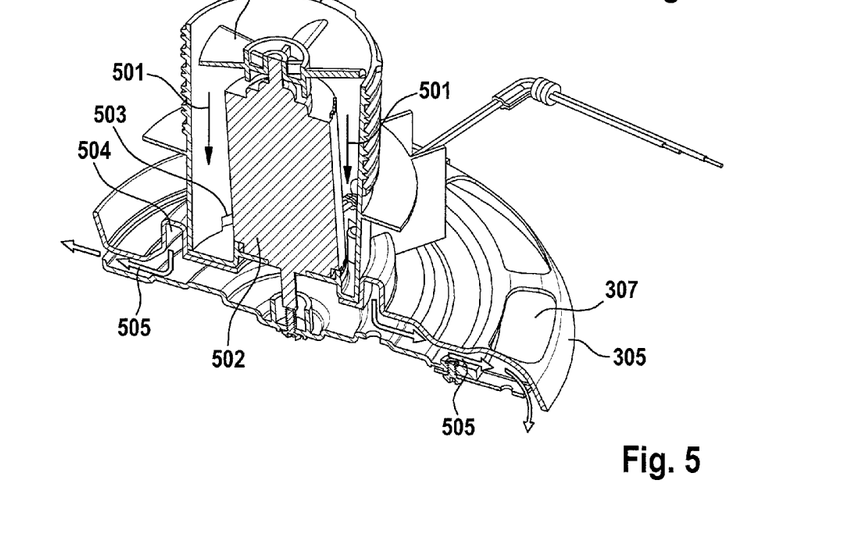
FIG. 5 is a cross-sectional view of the motor housing and cutter guard of FIGS. 3 and 4.

FIG. 5 is a cross sectional view of the housing and cutting bowl illustrated in FIG. 4. Fan 401 causes an air stream 501 to flow past motor 502 and subsequently through apertures 503 of the motor housing (one illustrated) into channel 504. The positioning of the apertures 503 and the shaping of channel 504 ensure that the air stream 505 is then blown radially across the underside of the cutter guard and the top of the cutter disc.

Figure 6:
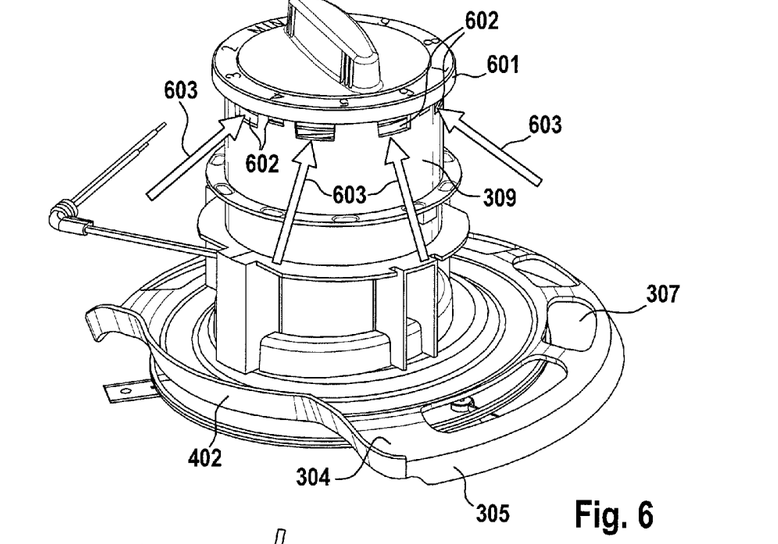
FIG. 6 is a further perspective view of the motor housing and cutter guard as shown in FIGS. 3 to 5.
Figure 7:
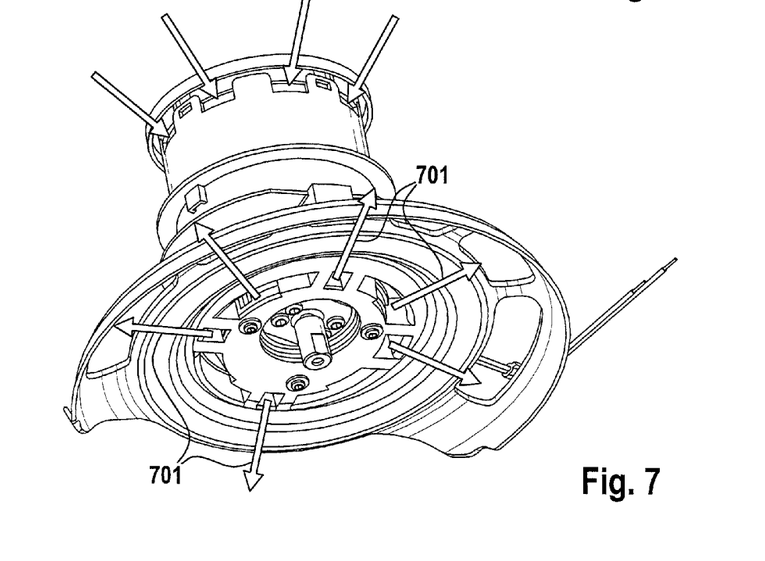
FIG. 7 is a perspective view of the underside of the arrangements of FIGS. 3 to 6.

FIG. 6 is a perspective view of the housing and cutting bowl. The upper section 601 of the housing is shown, with apertures 602 provided to allow air intake 603. FIG. 7 is a perspective view of the underside of the cutting bowl, showing radial airflows 701.

The design of the cutter guard is a balance of three desiderata. Firstly, adequate channels must be provided to allow the expulsion of grass cuttings and other debris from the cutter guard. Secondly, the air streams need to be channeled so as to direct debris from the surfaces of the bowl and the cutting blades. Finally, the construction must be sufficiently robust to provide a guard for the blade.

Figure 8:
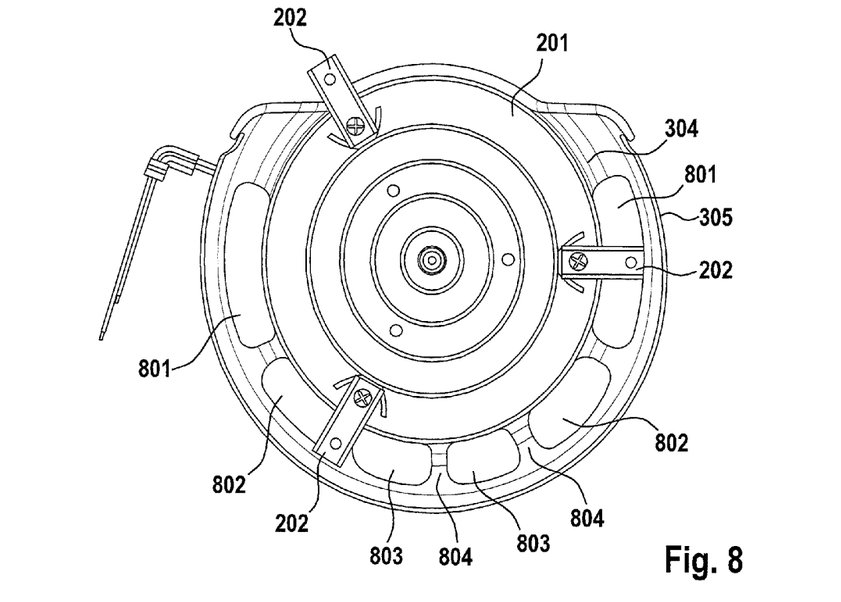
FIG. 8 illustrates a cutter guard according to a preferred embodiment of the invention.

The preferred embodiment therefore comprises elongate apertures in the form of arcuate slots ranging in size from the length of an arc along the circumference subtending an angle substantially 240 at the centre of the cutter guard to one subtending an angle of substantially 45°. A typical arrangement is illustrated in FIG. 8. In this embodiment, six elongate slots are provided. In the illustrated embodiment, the slots 801 to 803 are unequal in sizes. These are provided in a range of angular sizes, arranged symmetrically: two of 45° around the circumference (801), two of 28° (802) and two of 24° (803). The angularly larger slots are located adjacent to the grass entry opening, as this is the point at which most of the grass cuttings aggregate. Smaller apertures to the rear allow for a smaller spacing between connecting sections 804 between the outer rim and the main part of the bowl. This arrangement provides a high level of strength to the structure. Cutting disc 201 and blades 202 are also illustrated. The cutter guard comprises a solid disc, above the cutting disc, which cooperates with the cutting disc to form a guide for the air stream.

It can be seen that this design enables the apertures to occupy more than 40% of the area of arcuate section 304 and more than 50% in a preferred embodiment. More particularly, of the first 60° to 90°, preferably 70° to 80° and more preferably about 75° to at least one side of the front opening 306, from the point where the inner edge 307 of opening meets the side edge 308, advantageously, the apertures occupy at least 35% of the section, preferably at least about 40%. Although the design provides this to either side it will be appreciated that cuttings are typically thrown in the direction of cutter rotation and it is the aperture in the first 75° in this direction which contribute the most benefit.

Figure 9:
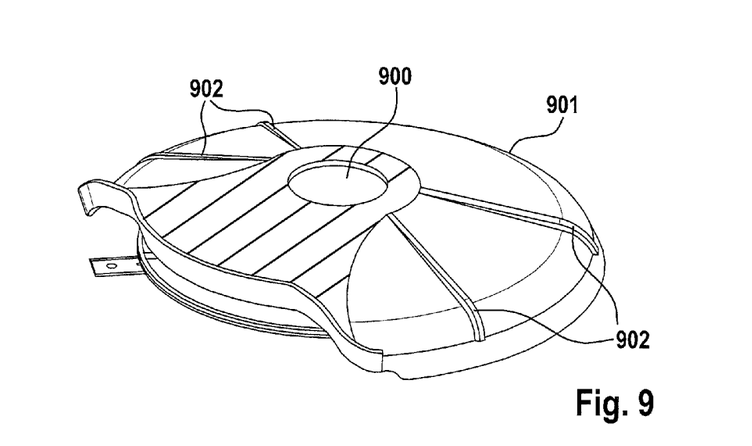
FIG. 9 is a perspective view of a first alternative embodiment of a cutter guard.

FIG. 9 illustrates a perspective view of an alternative design for the cutter guard. Here the cutting bowl comprises an outer rim 901, supported by struts 902 attaching to a small central disc 803. Thus the apertures for allowing the expulsion of debris are maximized. However, guidance of the air streams is reduced.

Figure 10:
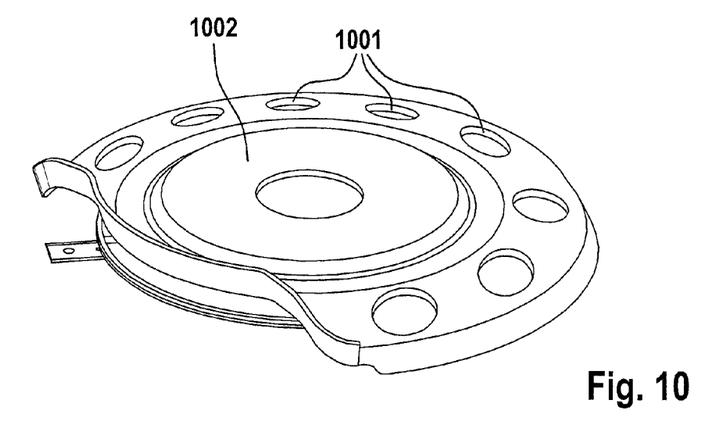
FIG. 10 is a perspective view of a second alternative embodiment of a cutter guard.
Figure 11:
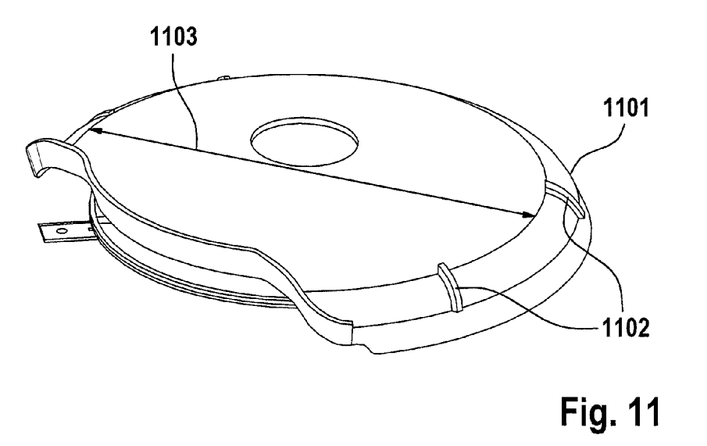
FIG. 11 is a perspective view of a third alternative embodiment of a cutter guard.

FIG. 10 shows a cutter guard with circular apertures 1001, all of the same size and a solid central disc 1002. FIG. 11 shows a guard comprising a rim 1101 suspended by minimal support structures 1102, extending from a solid central disc 1103.

The arrangement in FIG. 10 satisfactorily achieves the three objectives in the cutter guard design. However, the larger apertures achieve better expulsion of grass cuttings and reduce the possibility of longer cuttings being able to lodge across apertures. Elongate holes are also more efficient for this purpose. The embodiment in FIG. 11 provides an excellent performance in terms of the expulsion of cuttings and other debris, delivering almost 100% aperture and with the solid disc surface to guide the air stream as required. However, care is needed to ensure the strength of the construction of this embodiment.

Figure 12:
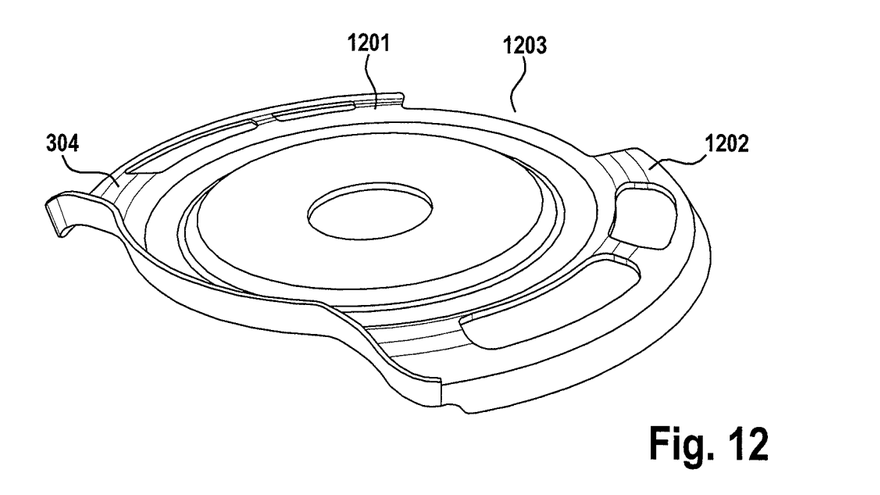
FIG. 12 is a perspective view of a fourth alternative embodiment of a cutter guard.

FIG. 12 illustrates a perspective view of yet another embodiment of the invention, comprising a cutter guard with an arcuate section 304 constructed from arcuate section elements 1201 and 1202, with a space or gap 1203 between them. In FIG. 12, two arcuate sections are shown, but the person skilled in the art will appreciate that more than two arcuate sections may be used, with a plurality of gaps between them. Optionally, the gaps may define one or more of the apertures of the arcuate section.

What is claimed is:

1. A cutter guard for a rotatable blade of a robotic rotary lawn mower, the guard forming a cutting bowl in which said blade is mounted for rotation about a generally vertical axis, said guard comprising:
   a generally planar guard section; and
   an arcuate section surrounding the guard section,
   wherein said arcuate section has transverse edges that define an opening in said cutter guard,
   wherein, in operation, said opening is oriented toward a front of said lawn mower to enable uncut grass to be accessed by the blade, and
   wherein said arcuate section includes a plurality of apertures configured to enable grass cuttings within the cutting bowl to exit the cutting bowl.

2. The cutter guard as claimed in claim 1, wherein said arcuate section subtends an angle of between 180° and 270° at a center of the guard.

3. The cutter guard as claimed in claim 1, wherein said apertures occupy an area greater than about 40% of a planar area of said arcuate section.

4. The cutter guard as claimed in claim 1, wherein said apertures occupy at least 35% of an area of the first 60° to 90° of the arcuate section from a point of meeting of an inner edge of said opening with a side edge of said opening.

5. The cutter guard as claimed in claim 1, further comprising:
   a first lip section extending downwardly from an outer edge of said arcuate section to a point substantially aligned with said blade.

6. The cutter guard as claimed in claim 1, further comprising:
   a second lip section upwardly extending along a length of said opening.

7. The cutter guard as claimed in claim 1, wherein said plurality of apertures includes at least three and at most ten apertures.

8. The cutter guard as claimed in claim 1, wherein said apertures have a shape that is one of circular, elliptical, annular segment shaped, and rectangular.

9. The cutter guard as claimed in claim 7, wherein said apertures are of different sizes in said arcuate section and subtend an angle between 15° and 60° at a center of the cutter guard.

10. The cutter guard as claimed in claim 9, wherein apertures located adjacent to said opening are larger than apertures remote said opening.

11. The cutter guard as claimed in claim 7 wherein the plurality of apertures includes six apertures, of which two are sized substantially 45° around a circumference of the arcuate section, two are sized substantially 28° around the circumference of the arcuate section, and two are sized substantially 24° around the circumference of the arcuate section.

12. The cutter guard as claimed in claim 1, wherein said arcuate section includes a plurality of discrete arcuate section elements.

13. The cutter guard as claimed in claim 12 wherein one or more apertures of the plurality of apertures are defined by one or more spaces between adjacent arcuate section elements.

14. The cutter guard as claimed in claim 3, wherein said apertures occupy an area greater than about 50% of said planar area of said arcuate section.

15. The cutter guard as claimed in claim 4, wherein said apertures occupy at least about 40% of an area of the first 75° of the arcuate section from the point of meeting of the inner edge of said opening with the side edge of said opening.

16. The cutter guard as claimed in claim 7, wherein said plurality of apertures includes at least four and at most eight apertures.

17. The cutter guard as claimed in claim 16, wherein said plurality of apertures includes six apertures.

18. A robotic rotary lawn mower, comprising:
   a cutting system
   a motor;
   a housing for said motor; and
   a cutter guard forming a cutting bowl in which said cutting system is mounted, the cutter guard including a generally planar guard section and an arcuate section surrounding the guard section,
   wherein said arcuate section has transverse edges that define an opening in said cutter guard,
   wherein, in operation, said opening is oriented toward a front of said lawn mower to enable uncut grass to be accessed by the cutting system, and
   wherein said arcuate section includes a plurality of apertures configured to enable grass cuttings within the cutting bowl to exit the cutting bowl.

19. The robotic rotary lawn mower as claimed in claim 18, further comprising:
   a fan positioned in said housing, wherein said fan is located above and powered by said motor, and wherein a channeling device guides an airstream from said fan radially across a surface of said cutter guard.

20. The robotic rotary lawn mower as claimed in claim 18, wherein:

the cutting system includes a cutter disc mounting at least one cutting blade, and the cutter guard apertures do not extend over said cutter disc.

* * * * *